United States Patent [19]
Jacobs et al.

[11] Patent Number: 6,038,147
[45] Date of Patent: Mar. 14, 2000

[54] POWER SUPPLY EMPLOYING CIRCULATING CAPACITOR AND METHOD OF OPERATION THEREOF

[75] Inventors: Mark E. Jacobs, Dallas; Yimin Jiang, Plano; Hengchun Mao, Plano; Vijayan J. Thottuvelil, Plano, all of Tex.

[73] Assignee: Lucent Technologies Inc., Murray Hill, N.J.

[21] Appl. No.: 09/191,441

[22] Filed: Nov. 12, 1998

[51] Int. Cl.[7] .............................. H02M 1/12; H02M 3/335
[52] U.S. Cl. ................................. 363/21; 363/40; 363/95; 363/131
[58] Field of Search .................................. 363/20, 21, 16, 363/40, 39, 95, 91, 131

[56] References Cited

U.S. PATENT DOCUMENTS

| | | | |
|---|---|---|---|
| 3,573,597 | 4/1971 | Genuit | 363/27 |
| 3,839,668 | 10/1974 | Black | 321/21 |
| 4,357,524 | 11/1982 | Apfelback et al. | 323/299 |
| 4,785,387 | 11/1988 | Lee et al. | 363/21 |
| 4,841,220 | 6/1989 | Tabisz et al. | 363/16 |
| 4,866,585 | 9/1989 | Das | 363/89 |
| 5,291,385 | 3/1994 | Vinciarelli | 363/20 |
| 5,621,625 | 4/1997 | Bang | 363/21 |
| 5,623,397 | 4/1997 | Vinciarelli | 363/20 |
| 5,774,351 | 6/1998 | Hsieh et al. | 363/17 |

OTHER PUBLICATIONS

"Power Electronics and Variable Frequency Drives" by Bimal K. Bose; 1997; pp. 369–378.

"Power Electronics: Circuits. Devices and Applications" Second Edition by Muhammad H. Rashid; 1993; pp. 218–221.

"A New Family of Isolated Zero–Voltage–Switched Converters" by R. Farrington, M.M. Jovanovic and F. C. Lee; 1991; pp. 181–191.

"A Highly Efficient and Compact Inverter Using a PWM Switching Amplifier for Telecommunications Signals" by Kazuo Tsukamoto. Tatsuo Sakai and Toshiaki Yachi; 1998; pp. 147–152.

U.S. Patent Application entitled "Dual Output Power Supply and Method of Operation Thereof" by Richard W. Farrington, et al., filed on Nov. 12, 1998, U.S. Serial No. 09/190,953, currently pending.

U.S. Patent Application entitled "Controller for Power Supply and Method of Operation Thereof" by Mark E. Jacobs, et al., filed on Nov. 12, 1998, U.S. Serial No. 09/191,442, currently pending.

*Primary Examiner*—Peter S. Wong
*Assistant Examiner*—Bao Q. Vu

[57] ABSTRACT

A power supply and method of operation thereof. In one embodiment, the power supply includes: (1) a primary side power switch, (2) an isolation transformer having a primary winding coupled to the primary side power switch, the primary side power switch conducting intermittently to transfer current from an input of the power supply to the isolation transformer, (3) a secondary side power switch, coupled to a secondary winding of the isolation transformer, that is operable to conduct within a conduction period of the primary side power switch to transfer current from the isolation transformer to an output of the power supply, a portion of the current being contained within the power supply during a nonconduction period of the secondary side power switch and (4) a capacitor, coupled to the secondary side power switch, that, circulates the portion toward the output during the nonconduction period.

21 Claims, 3 Drawing Sheets

POWER SUPPLY EMPLOYING CIRCULATING CAPACITOR AND METHOD OF OPERATION THEREOF

BACKGROUND OF THE INVENTION

A power converter is a power processing circuit that converts an input voltage waveform into a specified output voltage waveform. A switched-mode power converter is a frequently employed power converter that converts an input voltage waveform into a specified output voltage waveform. A buck power converter is one example of a switched-mode converter that converts the input voltage to an output voltage that is lower than the input voltage. Typically, the buck power converter is employed In applications wherein a stable, regulated voltage is desired at the output of the power converter A buck power converter generally includes an active switch coupled to a source of input voltage. The active switch intermittently switches to provide an output voltage to a load at an output of the buck power converter. A controller regulates the output voltage by varying a duty cycle of the active switch. Depending on the duty cycle of the active switch, the output voltage may be regulated to any desired voltage between zero and the input voltage. Employing a high switching frequency in the power converter may cause ripple fluctuations in the output voltage. Conventional buck power converters, therefore, typically include a low pass output filter having an inductor and an output capacitor. The corner frequency of the output filter may be set sufficiently lower than the switching frequency of the active switch to minimize the ripple fluctuations.

Since the active switch is coupled in series with the inductor, an inductor current is established during a conduction interval of the active switch. Opening the active switch may, therefore, result in a high voltage across the active switch unless an alternative path is provided for the inductor current. The problem of inductor current may be overcome by coupling a diode between the active switch and the inductor. During the conduction interval of the active switch, the diode is reversed biased. Then, during a nonconduction interval of the active switch, the inductor current flows through the diode, transferring some of its stored energy to the load. The buck power converter, like other switched-mode power converters, thus preferably includes at least two semiconductor switches, the active switch and the diode, to execute a switching cycle.

A principal advantage of switched-mode power supplies is an improved power processing efficiency over other circuit approaches such as linear regulators. Switched-mode power supplies may also be required to operate in four quadrants (e.g., provide a bipolar output voltage or transmit power in either direction at the input or output). If four-quadrant operation is required, conventional switched-mode power supplies typically employ a bipolar source of input power and an auxiliary active switch in place of the diode. While the use of two active switches may enable four-quadrant operation, circuit complexity is increased. Further, unlike the active switches employed in the buck power converter previously discussed, the active switches of the four-quadrant power supply may be required to block or conduct currents in both directions. Since many commonly available active switches, such as field-effect transistors (FETs), provide only unidirectional current blocking, each active switch may consist of two series-coupled FETs. In addition to the increased costs of providing the two active switches, custom controllers may also be required to provide isolated drive signals to the control terminals of the active switches, further increasing the cost and complexity of the power supply.

Accordingly, what is needed in the art is a current circulation device for a power supply and, additionally, a power supply that employs the current circulation device and is thus capable of bidirectional operation, thereby overcoming the h gh cost and complexities associated with the use of the two switches of the prior art.

SUMMARY OF THE INVENTION

To address the above-discussed deficiencies of the prior art, the present invention provides a power supply and method of operation thereof. In one embodiment, the power supply includes: (1) a primary side power switch, (2) an isolation transformer having a primary winding coupled to the primary side power switch, the primary side power switch conducting intermittently to transfer current from an input of the power supply to the isolation transformer, (3) a secondary side power switch, coupled to a secondary winding of the isolation transformer, that is operable to conduct within a conduction period of the primary side power switch to transfer current from the isolation transformer to an output c;the power supply, a portion of the current being contained within the power supply during a nonconduction period of the secondary side power switch and (4) a capacitor, coupled to the secondary side power switch, that circulates the portion toward the output during the nonconduction period.

The present invention therefore introduces the broad concept of employing a capacitor for current circulation. In conventional power supplies that provide DC outputs, the capacitor may be employed in lieu of a diode for current circulation. The capacitor is, of course, capable of bi-directional operation and may advantageously be employed in four-quadrant switched-mode power supplies in lieu of an auxiliary bi-directional active switch. As a passive device, the capacitor avoids the high cost and complexities associated with the use of the bi-directional active switch.

In one embodiment of the present invention, the power supply further includes an output capacitor coupled across the output. The output capacitor filters and smooths the output voltage, thus minimizing ripple fluctuations therein. In a related embodiment, the power supply further includes an inductor coupled to The output. In an alternative embodiment, the power supply further includes a filter resistor coupled to the output. The inductor or filter resistor filters the output voltage to minimize ripple fluctuations therein. Those skilled in the art will realize, of course, that neither the output capacitor, the inductor nor the filter resistor is necessary to practice the present invention.

In one embodiment of the present invention, the power supply further includes a resistor series-coupled to the secondary side power switch. The resistor supplements a parasitic resistance of the secondary side power switch and reduces a peak current therethrough.

In one embodiment of the present invention, the secondary side power switch is at least one metal oxide semiconductor field-effect transistor (MOSFET). In an alternative embodiment, the secondary side power switch is at least one insulated gate bipolar junction transistor (IGBT) . Those skilled in the art are familiar with conventional active switches such as MOSFETs and IGBTs. Of course, the use of other active switches is well within the broad scope of the present invention.

In one embodiment of the present invention, the input of the power supply is coupleable to a source of direct current (DC) power. In an alternative embodiment, the input may be coupled to a DC—DC converter via an isolation transformer. In a related embodiment, the DC—DC converter includes a primary inverter selected from the group consisting of an asymmetrical half bridge, a half bridge, a full bridge, a forward, a flyback, a Sepic, and a Zeta. Conventional inverter topologies are familiar to those skilled in the art. Of course, the present invention is not limited to the inverter topologies disclosed herein. In another related embodiment, the DC—DC converter further includes a rectifier selected from the group consisting of a half wave rectifier, a full wave rectifier, a hybridge rectifier, a multiple transformer rectifier and a flyback rectifier. Those skilled in the art will realize, of course, that the use of other rectifier topologies is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
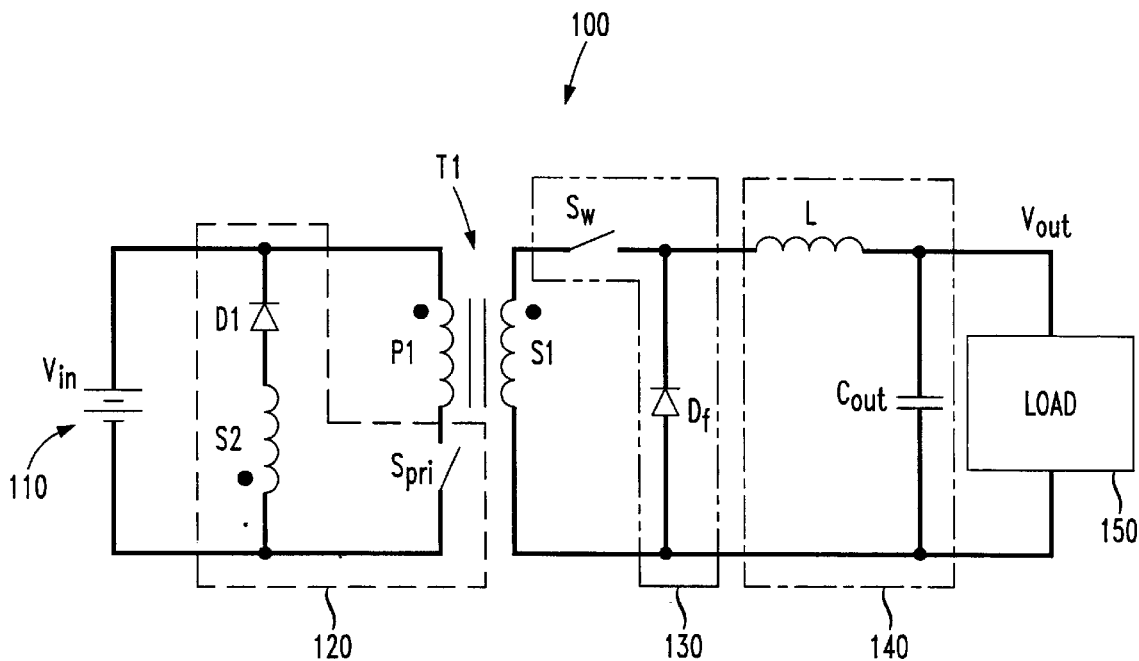
FIG. 1 illustrates a schematic diagram of a prior art forward power converter.

Referring initially to FIG. 1, illustrated is a schematic diagram of a prior art forward power converter 100. The forward power converter 100 is an isolated version of the buck power converter previously discussed. The forward power converter 100 has an input coupled to a source of input power 110 and an output coupleable t o a load 150. The forward power converter 100 includes a primary inverter 120 having a primary side power switch Spri coupled to the input. The forward power converter 100 further includes an isolation transformer T1 having a primary winding P1 coup led to the primary side power switch Spri and secondary and reset windings S1, S2. The primary side power switch Spri conducts intermittently to transfer current from the input to the isolation transformer T1. A diode D1, coupled to the reset winding S2, cooperates therewith to reset the flux in the transformer T1 during a nonconduction period of the primary side power switch Spri. Those skilled in the art will realize that the diode D1 and reset winding S2 represent only one method for resetting the flux in the transformer T1 and that other methods of resetting the flux in the transformer T1 may also be employed.

The forward power converter 100 further includes a rectifier 130 having an active switch Sw and a freewheeling diode Df coupled to the secondary winding S1. In the illustrated embodiment, the active switch Sw conducts in synchronism with the primary side power switch Spri to transfer current to the output of the forward power converter 100. The forward power converter 100 still further includes an output filter 140 having an inductor L and an output capacitor Cout coupled to the rectifier 130.

During a conduction period of the primary side power switch Spri, the freewheeling diode Df is reverse biased and power from the source of input power 110 is provided to both the inductor L and the load 150. Then, during the nonconduction period of the primary side power switch Spri, the active switch Sw opens, isolating the output from the secondary winding S1. The voltage impressed across the output filter 140 is, therefore, substantially zero during the nonconduction period of the primary side power switch Spri. Current now flows through the freewheeling diode Df to transfer some of the energy stored in the inductor L to the load 150. The output filter 140 filters and dampens the voltage fluctuations caused by the switching of the primary side power switch Spri and the active switch Sw to provide a substantially constant output voltage Vout at the output of the forward power converter 100.

While the freewheeling diode Df is adequate for power supplies that provide DC outputs, the freewheeling diode Df is a unidirectional device and thus is not capable of supporting four-quadrant operation. The present invention, therefore, introduces a circulating capacitor employable (in a preferred embodiment) in power supplies capable of four-quadrant operation.

Figure 2:
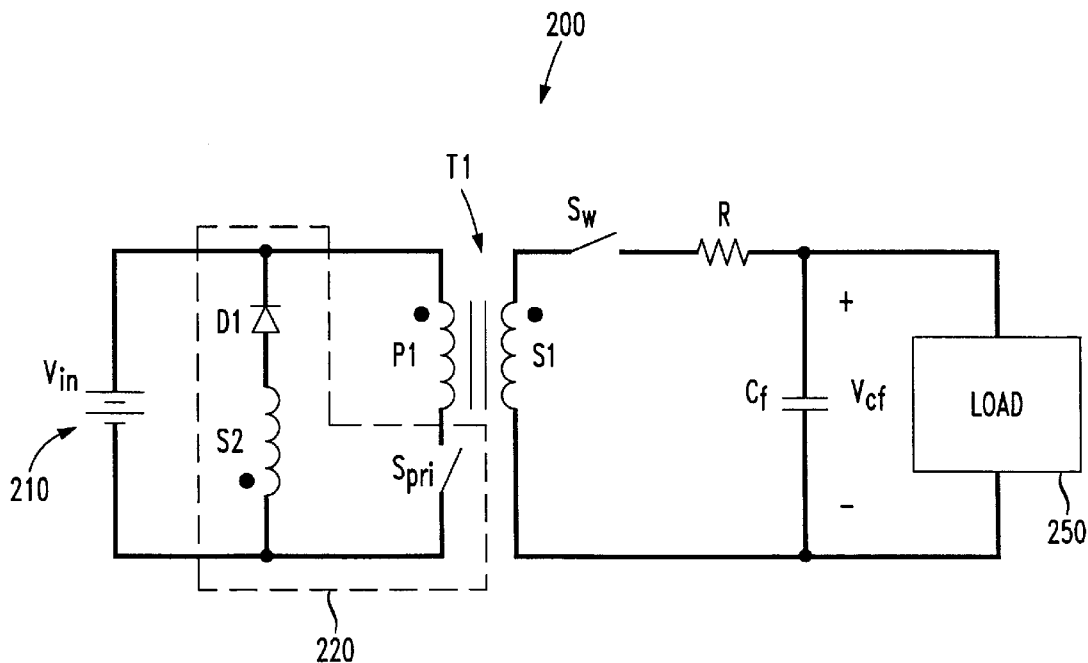
FIG. 2 illustrates a schematic diagram of an embodiment of a power supply constructed in accordance with the principles of the present invention.

Turning now to FIG. 2, illustrated is a schematic diagram of an embodiment of a power supply 200 constructed in accordance with the principles of the present invention. The power supply 200 has an input coupled to a source of input power 210 and an output coupleable to a load 250. The power supply 200 includes a primary inverter 220 having a primary side power switch Spri coupled to the input. The power supply 200 further includes an isolation transformer T1 having a primary winding P1 coupled to the primary side power switch Spri and secondary and reset windings S1, S2. The primary side power switch Spri conducts intermittently to transfer current from the input to the isolation transformer T1. The primary inverter 220 operates analogously to the primary inverter 120 of the forward power converter 100 of FIG. 1.

The power supply 200 further includes a secondary side power switch Sw coupled to the secondary winding S1. The secondary si(4e power switch Sw is operable to conduct within a conduction period of the primary side power switch to transfer current from the isolation transformer T1 to the output. In the illustrated embodiment, a portion of the current is contained within the power supply 200 during a nonconduction period of the secondary side power switch Sw. The power supply 200, therefore, further includes a capacitor (circulating capacitor Cf), coupled to the secondary side power switch Sw, that circulates the portion of the current toward the output during the nonconduction period of the secondary side power switch Sw. The power supply 200 further includes a resistor R coupled in series with the source of input power 210 and the circulating capacitor Cf.

While the resistor R is illustrated as a discrete component, those skilled in the art realize that the resistor R may be a parasitic resistance of the secondary side power switch Sw.

Figure 3:
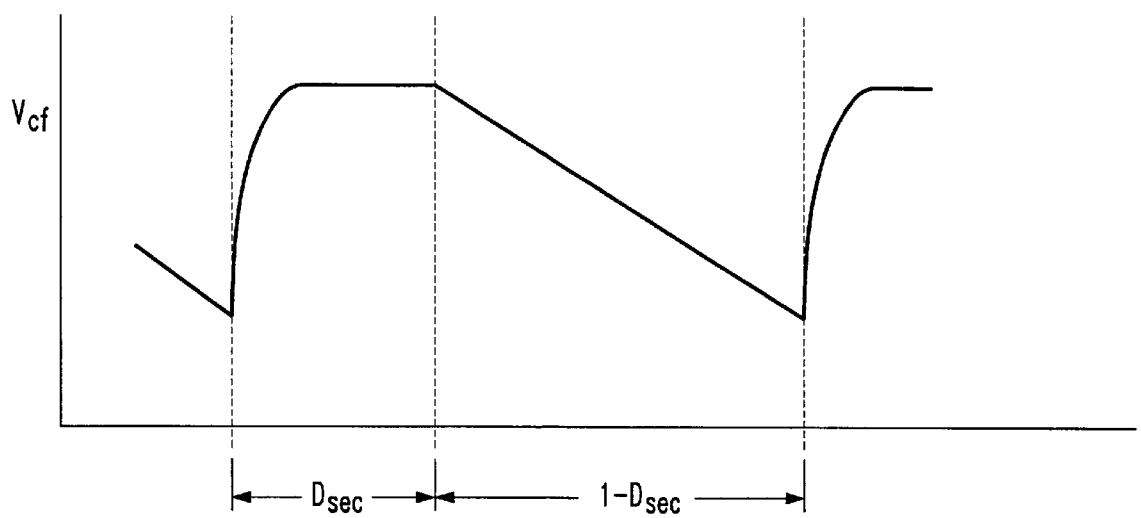
FIG. 3 illustrates a graph of a voltage across the capacitor of the power supply of FIG. 2.

Turning now to FIG. 3, illustrated is a graph of a voltage Vcf across the circulating capacitor Cf of the power supply 200 of FIG. 2. With continuing reference to FIG. 2, the power supply 200 operates as follows. The primary side power switch Spri conducts for a primary period D to impress the input voltage Vin across the isolation transformer T1. Then, for an auxiliary period 1-D, the primary side power switch Spri is nonconducting. The primary side power switch Spri thus develops an alternating voltage across the isolation transformer T1. The secondary side power switch Sw conducts within the primary period D or the auxiliary period 1-D (depending on a desired polarity of the output voltage) to impress the alternating voltage from the secondary winding S1 across the circulating capacitor Cf and the resistor R. During a conduction period Dsec of the secondary side power switch Sw, the circulating capacitor Cf quickly charges to a portion of the alternating voltage from the secondary winding S1. (See FIG. 3). Since the voltage Vcf across the circulating capacitor Cf may not always be equal to the alternating voltage from the secondary winding S1, the resistor R allows some energy to be dissipated. Then, during a nonconduction period 1-Dsec of the secondary side power switch Sw, the output is isolated from the alternating voltage at the isolation transformer T1. The circulating capacitor Cf now discharges to the load 250. The circulating capacitor Cf thus allows current to circulate toward the output during the nonconduction period 1-Dsec of the secondary side power switch Sw. The power supply 200 is therefore capable of supplying a bipolar output waveform at the output.

Figure 4:
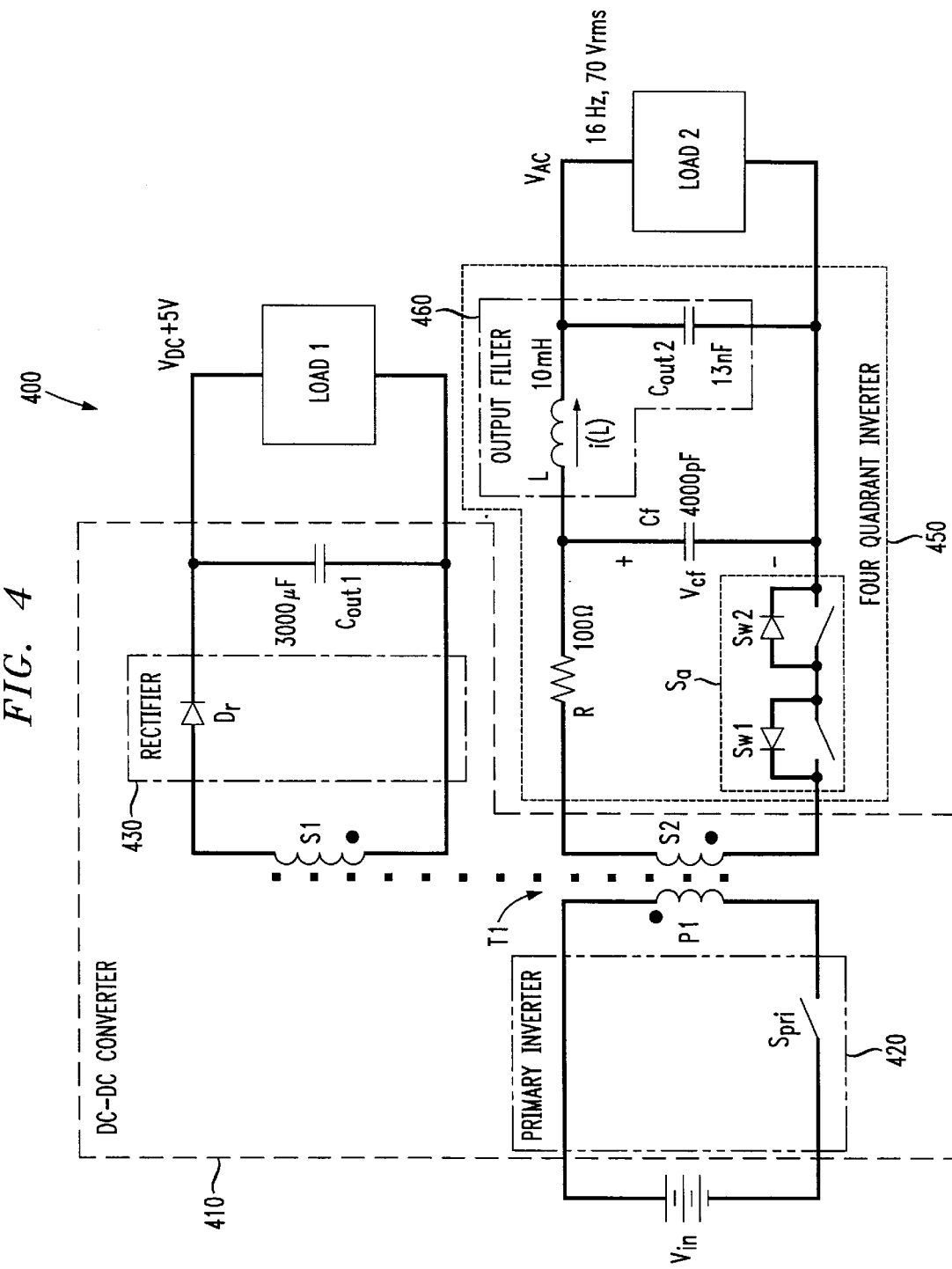
FIG. 4 illustrates a schematic diagram of another embodiment of a power supply constructed in accordance with the principles of the present invention.

Turning now to FIG. 4, illustrated is a schematic diagram of another embodiment of a power supply 400 constructed in accordance with the principles of the present invention. The power supply 400 includes a DC—DC converter 410 that receives a DC input voltage Vin at an input of the power supply 400 and generates a DC outfput voltage $V_{DC}$ at a first output of the power supply 400. Conventions converter topologies are familiar to those skilled in the art and, as a result, the DC—DC converter 410 will not be describe in detail. The power supply 400 further includes a four-quadrant inverter 450, coupled to the DC—DC converter 410, that generates an AC output waveform having a voltage $V_{AC}$ at a second output of the power supply 400. In the illustrated embodiment, a first load requiring a DC voltage is coupled to the first output. A second load requiring an AC voltage is coupled to the second output.

The DC—DC converter 410 includes a primary inverter 420 (e.g., a full-bridge, half-bridge, forward, flyback, Sepic or Zeta inverter) having a primary side power switch Spri coupled to an input of the power supply 400. The DC—DC converter 410 further includes an isolation transformer T1 having a primary winding P1 coupled to the primary side power switch Spri and first and second secondary windings S1, S2. The DC—DC converter 410 further includes a rectifier 430 coupled to the first secondary winding S1. In the illustrated embodiment, the rectifier 430 includes a rectifying diode Dr. Of course, other rectifier topologies e.g., a half wave rectifier, full wave rectifier, hybridge rectifier, multiple transformer rectifier or flyback rectifier) may also be advantageously employed with the principles of the present invention. The DC—DC converter 410 still further includes a first output capacitor Cout1 coupled to the rectifier 430. The DC—DC converter 410 provides the DC output voltage $V_{DC}$ at the first output of the power supply 400.

In the illustrated embodiment, the isolation transformer has a second secondary winding S2. The four-quadrant inverter 450 is thus coupled to the DC—DC converter 410 via the second secondary winding S2. Of course, the present invention is also applicable to topologies having more than one transformer or to topologies without transformers.

The four-quadrant inverter 450 includes a secondary side power switch Sa, coupled between the second secondary winding S2 and the second output of the power supply 400. In the illustrated embodiment, the secondary side power switch Sa is a bidirectional switch having opposing first and second unidirectional switches, Sw1, Sw2. Those skilled in the art will realize, of course, that other implementations of the secondary side power switch Sa are well within the broad scope of the present invention. Additionally, while the first and second unidirectional switches Sw1, Sw2 are illustrated as metal oxide semiconductor field-effect transistors (MOSFETs), those skilled in the art realize that the first and second unidirectional switches Sw1, Sw2 may be insulated gate bipolar junction transistors (IGBTs) or other conventional active switches. Further, while the first and second unidirectional switches Sw1, Sw2 of the secondary side power switch Sa are hereinafter described as concurrently switched, those skilled in the art will realize that the first and second unidirectional switches Sw1, Sw2 may also be switched individually, based on a level of current therethrough.

The four-quadrant inverter 450 further includes a circulating capacitor Cf coupled to the secondary side power switch Sa. The four-quadrant inverter 450 further includes a resistor R, series coupled to the secondary side power switch Sa. While the resistor R is illustrated as a separate element, those skilled in the art realize that the resistor R may be a parasitic resistance of the secondary side power switch Sa. The four-quadrant inverter 450 still further includes an output filter 460 having an inductor 1, and a second output capacitor Cout2. Alternatively, the output filter 460 may have a resistor in lieu of the inductor L. While the illustrated embodiment includes the output filter 460, those skilled in the art realize that the output filter 460 is not required to practice the present invention. The four-quadrant inverter 450 thus provides the AC output waveform at the second output of the power supply 400. Specific component values and output voltages are disclosed in the illustrated embodiment. Those skilled in the art will realize, of course, that the values shown are for illustrative purposes only and that the present invention is not restricted to such values and output voltages.

The power supply 400 operates as follows. The primary side power switch Spri of the primary inverter 420 conducts intermittently to transfer current from the input of the DC—DC converter 410 to the isolation transformer T1. The primary side power switch Spri thus applies an alternating voltage across the primary winding P1. In the illustrated embodiment, the primary inverter 420 is controlled by pulse-width modulation (PWM). The alternating voltage, therefore, exhibits a substantially rectangular and bipolar waveform. Those skilled in the art are familiar with conventional PWM techniques and the waveforms resulting therefrom. The isolation transformer T1 then conveys the alternating voltage between the primary winding P1 and the first and second secondary windings S1, S2.

The rectifier 430 rectifies an alternating voltage waveform from the first secondary winding S1. The first output capacitor Cout1 then filters the rectified waveform to supply the DC output voltage $V_{DC}$ at the first output of the power supply 400. In one embodiment of the present invention, the duty cycle of the primary side power switch Spri is regulated to maintain the DC output voltage $V_{DC}$ at a substantially constant voltage. In another embodiment, the primary inverter 420 may be free-running, providing an unregulated DC output voltage $V_{DC}$. Of course, rectifiers having active switches may be also employed, the rectifier switching to regulate the DC output voltage $V_{DC}$.

The four-quadrant inverter 450 is coupled to the second secondary winding S2. The four-quadrant inverter 450 receives an alternating voltage from the second secondary winding S2 and develops therefrom an AC waveform. In the illustrated embodiment, the alternating voltage from the second secondary winding S2 is at about a first frequency (e.g., 100 kHz) and exhibits both positive and negative voltages in each switching cycle of the primary inverter 420. For example, during a primary period D of the switching cycle, the alternating voltage from the second secondary winding S2 may be substantially negative. Then, during an auxiliary period 1-D of the switching cycle, the alternating voltage from the second secondary winding S2 may be substantially positive. The secondary side power switch Sa conducts to transfer a portion of the alternating voltage from the second secondary winding S2 to the output filter 460. The secondary side power switch Sa may, for example, conduct during the primary period D of the switching cycle to couple the negative voltage on the second secondary winding S2 to the output filter 460. Alternatively, the secondary side power switch Sa may conduct during the auxiliary period 1-D of the switching cycle to couple the positive voltage on the second secondary winding S2 to the output filter 460. Of course, the bi-directional switch Sa may conduct during both the primary and auxiliary periods D, 1-D of the switching cycle.

During the conduction period of the secondary side power switch Sa, the circulating capacitor Cf charges to a voltage that may be as large as the alternating voltage from the second secondary winding S2. Since the voltage Vcf across the circulating capacitor Cf may not initially be equal to the alternating voltage from the second secondary winding S2, some energy will be dissipated in the resistor R. The alternating voltage from the second secondary winding S2 provides power to both the inductor L and the second load. The second load establishes a current through both the second load and the inductor L. Then, during a nonconduction period of the secondary side power switch Sa, the alternating voltage from the second secondary winding S2 is isolated from the second output. The circulating capacitor Cf now discharges in a resonant manner through the inductor L to the second output capacitor Cout2 and the second load. The circulating capacitor Cf thus allows the current to circulate toward the second output during the nonconduction period of the secondary side power switch Sa. The output filter 460 then filters and dampens the voltage fluctuations caused by the switching of the secondary side power switch Sa to provide the AC output waveform.

For a better understanding of power electronics, including power supplies and four-quadrant inverters, see *Power Electronics: Converters, Applications and Design*, by N. Mohan, T. M. Undeland and W. P. Robbins, John Wiley & Sons Publishing Company (1989); *Power Electronics and Variable Frequency Drives*, by B. K. Bose, IEEE Press (1997); *Power Electronics: Circuits, Devices, and Applications*, Second Edition, by M. H. Rashid, Prentice Hall (1993); and *A New Family of Isolated Zero-Voltage-Switched Converters*, by R. Farrington, M. M. Jovanovic and F. C. Lee, in *Proceedings of the Power Electronics Society Conference* (1991). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. A power supply, comprising:

a primary side power switch;

an isolation transformer having a primary winding coupled to said primary side power switch, said primary side power switch conducting intermittently to transfer current from an input of said power supply to said isolation transformer;

a secondary side power switch, coupled to a secondary winding of said isolation transformer, that is operable to conduct within a conduction period of said primary side power switch to transfer current from said isolation transformer to an output of said power supply, a portion of said current being contained within said power supply during a nonconduction period of said secondary side power switch; and a capacitor, coupled to said secondary side power switch, that circulates said portion toward said output during said nonconduction period.

2. The power supply as recited in claim 1 further comprising an output capacitor coupled across said output.

3. The power supply as recited in claim 1 further comprising an inductor coupled to said output.

4. The power supply as recited in claim 1 further comprising a filter resistor coupled to said output.

5. The power supply as recited in claim 1 further comprising a resistor series-coupled to said secondary side power switch.

6. The power supply as recited in claim 1 wherein said secondary side power switch is selected from the group consisting of:

at least one metal oxide semiconductor field-effect transistor (MOSFET); and at least one insulated gate bipolar transistor (IGBT).

7. The power supply as recited in claim 1 wherein said input is coupleable to a source of direct current (DC) power.

8. A method of operating a power supply having a primary side power switch and an isolation transformer having a primary winding coupled to said primary side power switch, said primary side power switch conducting intermittently to transfer current from an input of said power supply to said isolation transformer, said method comprising:

causing a secondary side power switch coupled to a secondary winding of said isolation transformer to conduct within a conduction period of said primary side power switch to transfer current from said isolation transformer to an output of said power supply, a portion of said current being contained within said power supply during a nonconduction period of said secondary side power switch; and circulating said portion toward said output with a capacitor, coupled to said secondary side power switch, during said nonconduction period.

9. The method as recited in claim 8 further comprising filtering said current with an output capacitor coupled across said output.

10. The method as recited in claim 8 further comprising filtering said current with an inductor coupled to said output.

11. The method as recited in claim 8 further comprising filtering said current with a filter resistor coupled to said output.

12. The method as recited in claim 8 further comprising attenuating said current with a resistor series-coupled to said power switch.

13. The method as recited in claim 8 wherein said secondary side power switch is selected from the group consisting of:
   at least one metal oxide semiconductor field-effect transistor (MOSFET); and
   at least one insulated gate bipolar junction transistor (IGBT).

14. The method as recited in claim 8 wherein said input is coupleable to a source of direct current (DC) power.

15. A power supply, comprising:
   a DC—DC converter including:
      a primary inverter having a primary side power switch,
      an isolation transformer having a primary winding coupled to said primary side power switch and first and second secondary windings, said primary side power switch conducting intermittently to transfer current from an input of said DC—DC converter to said isolation transformer; and
      a rectifier, coupled to said first secondary winding; and
   a four-quadrant inverter, coupled to said second secondary winding, including:
      a secondary side power switch, coupled to said second secondary winding, that is operable to conduct within a conduction period of said primary side power switch to transfer current from said isolation transformer to an output of said power supply, a portion of said current being contained within said power supply during a nonconductor period of said secondary side power switch; and
      a capacitor, coupled to said secondary side power switch, that circulates said portion toward said output during said nonconduction period.

16. The power supply as recited in claim 15 wherein said four-quadrant inverter further includes an output filter, coupled to said capacitor, that filters said current for delivery to said output.

17. The power supply as recited in claim 16 wherein said output filter includes an element selected from the group consisting of:
   an output capacitor;
   an inductor; and
   a filter resistor.

18. The power supply as recited in claim 15 wherein said four-quadrant inverter further includes a resistor series-coupled to said secondary side power switch.

19. The power supply as recited in claim 15 wherein said secondary side power switch is selected from the group consisting of:
   at least one metal oxide semiconductor field-effect transistor (MOSFET), and
   at least one insulated gate bipolar junction transistor (IGBT).

20. The power supply as recited in claim 15 wherein said primary inverter is selected from the group consisting of:
   an asymmetrical half bridge,
   a half bridge,
   a full bridge,
   a forward,
   a flyback,
   a Sepic, and
   a Zeta.

21. The power supply as recited in claim 15 wherein said rectifier is selected from the group consisting of:
   a half wave rectifier,
   a full wave rectifier,
   a hybridge rectifier,
   a multiple transformer rectifier, and
   a flyback rectifier.

* * * * *